United States Patent [19]

Baermann

[11] 3,899,223

[45] Aug. 12, 1975

[54] MAGNETIC BEARING

[76] Inventor: Max Baermann, 506 Bensberg Bezirk, Cologne, Rhine, Germany

[22] Filed: Nov. 18, 1971

[21] Appl. No.: 200,136

[30] Foreign Application Priority Data

Jan. 27, 1971 Germany.............................. 2103737

[52] U.S. Cl.................................... 308/10; 306/10
[51] Int. Cl.².......................................... F16C 32/04
[58] Field of Search........................................ 308/10

[56] References Cited
UNITED STATES PATENTS 3,233,950    2/1966   Baermann............................. 308/10
3,326,610    6/1967   Baermann............................. 308/10

*Primary Examiner*—Donovan F. Duggan
*Attorney, Agent, or Firm*—Meyer, Tilberry & Body

[57] ABSTRACT

A magnetic suspension bearing includes a pair of cylindrical magnets. Each magnet is magnetized to have one pole on an end surface thereof and another pole on the peripheral surface thereof. Like poles on the end surfaces of the two magnets face one another. The lines of flux extend out beyond the outer periphery of the two magnets to obtain optimum repulsive force while minimizing radial forces resulting from radial misalignment between the longitudinal axes of the two cylindrical magnets.

8 Claims, 11 Drawing Figures

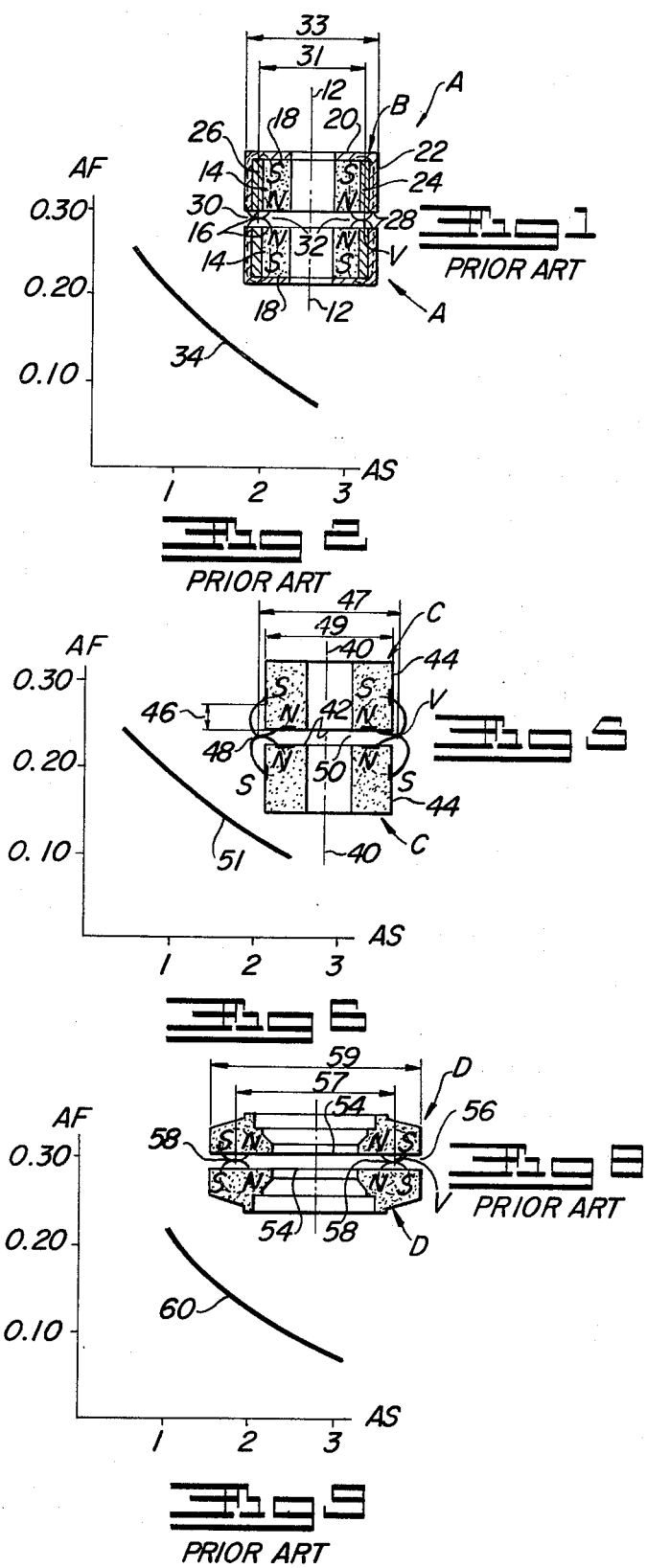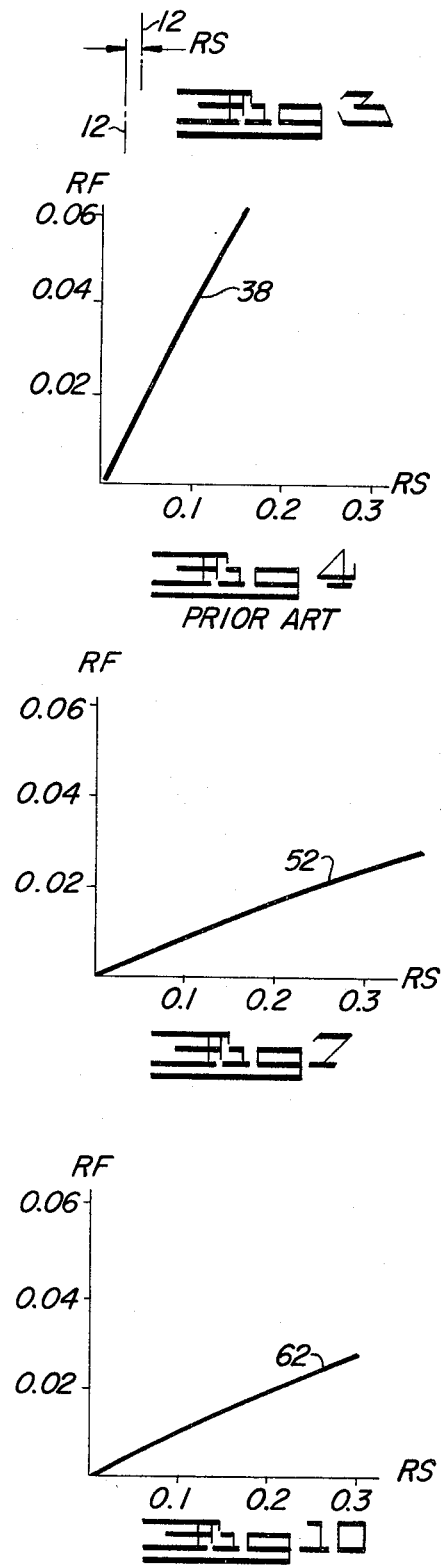

MAGNETIC BEARING

BACKGROUND OF THE INVENTION

This application pertains to the art of magnetic suspension bearings and more particularly to magnetic suspension bearings for shafts which rotate on a vertical axis. The invention is particularly applicable for use in an electricity meter and will be particularly described with reference thereto. However, it will be recognized that the invention has broader applications and may be used in other devices having rotating shafts.

Known magnetic bearings include pairs of ring disc or cylindrical magnets which are positioned to exploit the attractive effect of unlike poles or the repulsive effect of like poles, or a combination of both. Such arrangements make it possible to float or suspend a shaft using magnetic forces so that frictional forces are reduced to a minimum.

One known arrangement for floating a vertical spindle in a polyphase watt-hour meter includes a pair of ring disc permanent magnets having like poles axially facing one another. Each ring disc magnet is provided with a pair of concentric radially-spaced opposite poles on an end surface thereof. Like poles on the end surface of each ring disc magnet face one another. The magnets repulse one another to provide good supporting forces with relatively small radial forces if axial misalignment exists. With such arrangements, the ring disc magnets must have a relatively large diameter in order to have a pair of radially-spaced concentric opposite poles on an end surface thereof. With a large diameter, such ring disc magnets cannot be incorporated in all existing polyphase watt-hour electricity meters. The use of such magnets often requires replacement of the entire frame of the meter. Polyphase watt-hour meters require magnets which are capable of supporting relatively large axial forces. Ring disc magnets having concentric poles on one end surface thereof must be of a large diameter in order to provide the needed pole areas and obtain the necessary repulsive force.

Magnetic bearings having relatively small diameters are also known. In one such arrangement, two cylindrical magnets are positioned in iron cups. One end surface portion of each magnet forms one pole and the end edge of the iron cup forms the other pole. The magnet itself may be magnetized so that one pole is on the peripheral surface thereof as in U.S. Pat. No. 3,326,610 issued June 20, 1967, to Baermann, or maybe magnetized to have opposite poles on the opposite end surfaces thereof. Magnetic forces from the two poles on the pair of magnets which do not face one another are carried through the high permeability iron cup to the facing surfaces of the two magnets. With this arrangement, it is possible to keep the magnetic bearing at a small diameter while having pairs of opposite poles face one another across the air gap to achieve a relatively large repulsive force. With such magnetic bearing arrangements, the lines of magnetic force are very steep and concentrated within the air gap. This results in relatively strong radial forces occurring if the pair of magnets are axially misaligned. In order to minimize such radial forces, extremely high precision work is necessary in order to prevent axial misalignment. This greatly increases production costs. Radial misalignment between the axes of the two magnets will result in excessive friction and wear on the guide bearings.

SUMMARY OF THE INVENTION

A magnetic suspension bearing includes a pair of cylindrical permanent magnets which are magnetized to have one circumferential pole on an end surface portion thereof and an opposite circumferential pole on a peripheral surface thereof. Like poles on the end surfaces of the two magnets are positioned facing one another across an air gap. The lines of magnetic force extend out beyond the periphery of the magnets to provide very strong repulsive force. However, the lines of magnetic force are relatively flat and not so concentrated in the air gap so that radial forces are minimized if axial misalignment occurs.

The arrangement described makes it possible to create magnetic suspension bearings which combine a very small diameter with high repulsive supporting force and very small radial forces. This arrangement is particularly advantageous with cast or sintered permanent magnets which may not have a homogenous magnetization because very small stopping moments are produced and have no detrimental effect on the bearing. Naturally, it will be appreciated that the magnets for magnetic suspension bearing of the present invention may also be formed of powdered permanent magnet material and a thermoplastic or duroplastic binder, with the powder being finely distributed in the binder.

The efficiency of the magnet bearing constructed in accordance with the present invention roughly corresponds to that of a magnet bearing having a considerable larger diameter wherein two concentric poles are on an end surface of the magnets.

The arrangement of the present invention renounces known arrangements wherein concentric poles are provided on one end surface of the magnets or where the lines of magnetic force are guided to the air gap by an iron cup or sleeve.

It has been surprisingly found that the bearing arrangement of the present invention achieves substantially the same supporting forces with considerably lower radial forces as compared with known bearings of the type which utilize iron cups or sleeves. With the bearing of the present invention the lines of magnetic flux from the two cylindrical permanent magnets interact at a circular vertex having a diameter larger than the diameter of the magnets. This makes it possible to achieve high supporting forces with small magnet diameters, while minimizing radial forces due to axial misalignment.

In accordance with a preferred arrangement, the pole which is formed on the peripheral surface portion of the cylindrical magnet may be formed in any desired position for optimum efficiency. That is, the pole on the peripheral surface portion may be shifted up or down relative to the end surface of the magnet on which the other pole is formed. In the preferred arrangement, the distance between the pole on the peripheral surface and the end surface on which the other pole is formed should be at least 1 millimeter. It is also very important that the areas of the poles on the peripheral surface and on the end surface be substantially the same.

With the arrangement of the present invention, it is possible to create a magnetic bearing having very small dimensions so that it can be incorporated in the most diverse types of available electricity meters without requiring any changes in the meter dimensions or structure. This is possible due to the small dimensions and special magnetization of the magnets.

It is a principle object of the present invention to provide an improved magnetic suspension bearing which provides very high supporting repulsive forces while using magnets having very small dimensions.

It is also an object of the present invention to provide a magnetic suspension bearing having very small dimensions and high supporting forces while minimizing radial forces due to axial misalignment between the magnets.

It is another object of the present invention to provide a magnetic suspension bearing which minimizes loads on the guide bearings when axial misalignment is present between the two cylindrical magnets.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 1 is a cross-sectional elevational view of a prior art magnetic bearing arrangement;

FIG. 2 is a graph showing the repulsive force produced with the magnetic bearing arrangement of FIG. 1;

FIG. 3 is a showing of radial misalignment between the longitudinal axes of the two magnets used in the bearing of FIG. 1;

FIG. 4 is a graph showing radial forces produced due to radial misalignment between the longitudinal axes of the two magnets used in the bearing of FIG. 1;

FIG. 5 is a cross-sectional elevational view showing the magnetic bearing arrangement of the present invention;

FIG. 6 is a graph showing the repulsive force produced with the magnetic bearing arrangement of FIG. 5;

FIG. 7 is a graph showing radial forces produced due to radial misalignment between the longitudinal axes of the two magnets used in the bearing of FIG. 5;

FIG. 8 is a cross-sectional elevational view of another prior art magnetic bearing arrangement;

FIG. 9 is a graph showing the repulsive forces produced with the bearing arrangement of FIG. 8;

FIG. 10 is a graph showing the radial forces produced due to radial misalignment between the longitudinal axes of the two magnets in the bearing of FIG. 8.

DESCRIPTION OF THE PREFERRED EMBODIMENT

Figure 11:
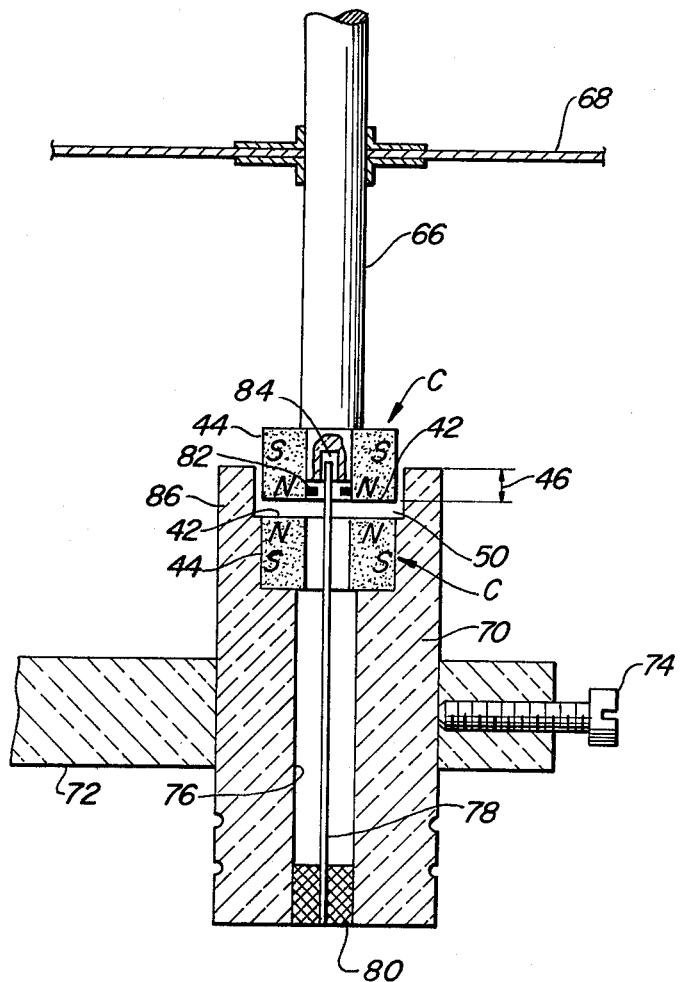
FIG. 11 is a partial cross-sectional elevational view showing the improved magnetic bearing of the present invention installed in an electricity meter.

Referring now to the drawings, wherein the showings are for purposes of illustrating a preferred embodiment of the invention only and not for purposes of limiting same, FIG. 1 shows one prior art type of magnetic suspension bearing for an electricity meter. A pair of substantially identical cylindrical magnets A are positioned with their longitudinal axes 12 extending vertically. Each cylindrical magnet A includes a cylindrical permanent magnet 14 having one pole formed on an end surface 16 thereof. In the arrangement shown, the letter N indicates that a north pole is formed on end surfaces 16. However, it will be recognized that the south pole may be formed on end surfaces 16. An opposite magnetic pole is formed on opposite end surfaces 18 of each magnet 18. In the arrangement shown, the letter S indicates that the south pole is formed on end surfaces 18. It will be recognized that the position of the poles may be reversed if so desired. Magnet 14 is received in an iron cup B having its bottom wall 20 contacting end surface 18. Peripheral wall 22 of iron cup B is spaced radially outward from outer peripheral surface 24 of magnet 14 and the resulting radial space is filled with a non-magnetic material 26 such as a tin alloy. Peripheral edge 28 of cup B lies in the same plane as end surface 16. The lines of magnetic force extend from the pole at end surface 18 through cup B to peripheral edge 28 so that there are a pair of opposite concentric poles facing one another across air gap 30 between magnets A. The lines of magnetic force extend through air gap 30 from the pole formed on end surface 16 to the pole defined by peripheral edge 28 of cup B. These lines of magnetic force 32 are very steep and concentrated in air gap 30. With the arrangement described, magnets A repulse one another.

In the arrangement of FIG. 1, lines of magnetic flux 32 interact at a circular vertex V having a diameter 31 less than diameter 33 of each magnet A. Thus, the diameter of the circle on which the effective repulsive force acts is relatively small.

FIG. 2 is a graph showing the repulsive force produced for different distances between facing end surfaces 16. In the graph of FIG. 2, the distance separating end surfaces 16 to define air gap 30 is plotted in millimeters on the abscissa and indicated by letters AS which stand for axial spacing. Also in the graph of FIG. 2, the axial force of repulsion between magnets A is plotted on the ordinate in tenths of Newtons and indicated by the letters AF which stand for axial force. As is known, the repulsive force decreases with increased axial spacing between end surfaces 16. The extent to which this decrease in repulsive force takes place can be seen from the shape of curve 34 in FIG. 2.

In conventional arrangements, lower magnet A of FIG. 1 is non-rotatably fixed to the frame of an electricity meter while upper magnet A is secured for rotation with the rotatable vertical shaft or spindle of the electricity meter. When assembling both upper and lower magnets A in an electricity meter, it is extremely difficult to obtain exact alignment between each longitudinal axis 12. There is usually some radial misalignment between longitudinal axes 12. An exaggerated example of such radial spacing is shown in FIG. 3, and indicated by the letters RS. FIG. 4 is a graph wherein radial spacing RS is plotted in tenths of a millimeter on the abscissa. The radial force RF resulting from radial spacing RS is plotted on the ordinate in hundredths of Newtons. Curve 38 is very steep and the radial force RF rapidly increases with increasing radial spacing RS. Such high radial forces adversely affect the guide bearings for the rotatable spindle.

FIG. 5 shows a bearing arrangement constructed in accordance with the present invention. Two cylindrical permanent magnets C are positioned with their longitudinal axes 40 extending vertically. The lower magnet C is adapted for securement to the frame of an electricity meter. Upper magnet C is adapted for securement to the rotatable vertical spindle of an electricity meter. Each magnet C has been magnetized so that it has a circumferential north pole on a portion of end surface 42.

The area of the pole is represented by a thicker line on each end surface 42. Each magnet C is also magnetized with a circumferential south pole on a portion of the outer peripheral surface thereof. The south pole is indicated on surfaces 44 by a thicker line and by the letter S. It will be recognized that the position of the poles may be reversed so that the north pole would be on peripheral surface 44 and the south pole on end surface 42. Surfaces 42 of the two magnets have like poles facing one another.

It is possible to shift the location of the south pole up or down on peripheral surface 44 relative to end surface 42. However, it is very important that the pole areas for both the north and the south poles occupy substantially the same area. In addition, it is very desirable that space 46 from end surface 42 to the beginning of south pole S be at least 1 millimeter. With the arrangement described, the lines of magnetic force 48 extend into air gap 50 between facing end surfaces 42 and curve smoothly out beyond the outer periphery of the magnets. This gives a much wider area in which the lines of magnetic force from each magnet interact with one another to produce the repulsive force. Therefore, even though the lines of magnetic force are not as steep and concentrated as in the arrangement of FIG. 1, the repulsive force is substantially the same because the lines of magnetic force extend out beyond the outer periphery of the magnets to provide a larger area over which the repulsive force may take effect.

In the arrangement of FIG. 5, lines of magnetic flux 48 interact at a circular vertex V having a diameter 47 greater than diameter 49 of each magnet C. Thus, the diameter of the circle on which the effective repulsive force acts is relatively large.

FIG. 6 is a graph plotted with the same values as FIG. 2 for the magnetic bearing arrangement of FIG. 5. It will be noted that curve 51 is substantially the same as curve 34 in FIG. 2 so that the repulsive effect produced by the bearing arrangement of FIG. 5 is substantially the same as that produced with the arrangement of FIG. 1.

FIG. 7 is a graph plotted with the same values as described with reference to FIG. 4 and showing the radial forces produced by radial spacing for the magnetic bearing of FIG. 5. Due to the flattening and smooth curving of the lines of magnetic force 48 out beyond the peripheral surfaces of the magnets, the radial force produced by radial misalignment is substantially less than the radial force produced with the bearing arrangement of FIG. 1. As is clearly evident from FIG. 7, curve 52 is much flatter than curve 38 of FIG. 4 so that the radial force produced by radial spacing between longitudinal axes 40 is minimized and wear on the guide bearings is greatly reduced.

With the arrangement of FIG. 5, the outer diameter of magnets C is substantially the same as the outer diameter of magnets A in FIG. 1. Thus, as can be seen from a comparison of the curves in FIGS. 2 and 6, it is possible with the arrangement of FIG. 5 to obtain substantially the same repulsive force as in the arrangement of FIG. 1 while eliminating the iron cup. However, as can be seen from a comparison of the curves in FIGS. 4 and 7, radial forces produced by axial misalignment between the longitudinal axes of the two magnets are considerably lower for the arrangement of FIG. 5.

In an arrangement wherein diameter 49 is substantially the same as diameter 33, it is evident that diameter 47 of the circle on which the effective repulsive force acts is substantially greater than diameter 31. Thus, even though the magnetic field is weaker, the effective repulsive force acts over a substantially greater circumference to achieve high repulsion. However, the larger diameter of the circle on which the repulsive force acts substantially reduces radial force caused by axial misalignment of the two magnets.

The values for the graphs shown and described were obtained with magnets A and C having an outside diameter of around 9 millimeters and an inside diameter of around 3 millimeters. Comparison between the graphs of FIGS. 2 and 6 shows that curves 34 and 51 have nearly the same shape. This means that the two bearing arrangements have substantially the same repulsive supporting forces depending upon the air gap. In contrast, a comparison between FIGS. 4 and 7 clearly shows that the radial force resulting from lateral or radial displacement between the longitudinal axes of the two magnets is considerably lower in the bearing arrangement of FIG. 5. The values of the radial forces used in plotting the graphs of FIGS. 4 and 7 were measured at an air gap between facing end surfaces of the magnets of around 1 millimeter.

FIG. 8 shows another known bearing arrangement wherein two ring disc magnets D have end surfaces 54 facing one another across an air gap 56. Each magnet D has a pair of concentric radially spaced poles N and S formed on its end surface 54. Like poles of each magnet D face one another to provide a repulsive force. With this type of magnetic bearing, it is necessary that each magnet D have a considerably larger diameter than magnets A and C of FIGS. 1 and 5 in order to form both the north and south poles concentrically on one end surface, and to provide sufficient radial space between the poles so that lines of magnetic force 58 are not extremely steep or concentrated within air gap 56.

In the arrangement of FIG. 8, lines of magnetic flux 58 interact at a circular vertex V having a diameter 57 less than diameter 59 of each magnet D. Thus, the diameter of the circle on which the effective repulsive force acts is relatively small compared to the diameter of the magnets.

FIG. 9 is a graph similar to FIGS. 2 and 6 showing the repulsive force for the magnetic bearing arrangement of FIG. 8. A comparison of curve 60 in FIG. 9 with curves 34 and 51 clearly shows that the repulsive force for the arrangement of FIG. 8 is substantially the same as the arrangements of FIGS. 1 and 5.

FIG. 10 is also a graph similar to FIGS. 4 and 7, and showing the radial force produced by radial misalignment of the magnets in FIG. 8. The radial force produced by radial misalignment of the magnets in FIG. 8 is indicated by curve 62 and is substantially the same as curve 52 in FIG. 7. However, the magnets of FIG. 8 must be of substantially larger diameter than the magnets of FIG. 5 in order to achieve flat curve 62 of FIG. 10. The values for the graphs in FIGS. 9 and 10 were obtained for magnets D having an outside diameter of around 15 millimeters. Therefore, in order to achieve a relatively flat arrangement for lines of magnetic force 58, it is necessary that magnets D have a diameter of around 5 millimeters greater than the diameter of magnets C in FIG. 5. By increasing the diameter of the magnets and forming the poles concentrically on an end surface thereof, it is possible to achieve a very low radial force as clearly shown by the graph of FIG. 10. However, the necessity of increasing the diameter of the magnets makes it impossible to fit the magnetic bearing arrangement in many existing polyphase watt-hour meters. This makes it necessary to change the frame or to build a meter having a larger housing. Due to the large diameter of magnets D, they cannot be incorporated in any existing electricity meters. Where diameter 57 is the same as diameter 47, it is obvious that diameter 59 must be susbstantially greater than diameter 49.

It will be recognized that the arrangement of the present invention makes it possible to exploit the advantages of known magnetic bearings, while avoiding their disadvantages, such as strong radial forces, large dimensions and increased production costs.

FIG. 11 shows a lower suspension bearing for an electricity meter using the magnet arrangement of FIG. 5. Upper cylindrical bearing C is attached to the lower end of vertical shaft or spindle 66 which carries rotor disc 68 and is secured against radial displacement at its upper end in a conventional guide bearing which is not shown. Lower cylindrical permanent magnet C is fixedly attached to bearing shell 70 which is made of non-magnetic material. Bearing shell 70 is arranged for vertical adjustment relative to horizontal frame part 72 and can be fixed in adjusted position by means of set screw 74. Bearing shell 70 has a centrally located bore 76 in which a bearing pin 78 is centrally located and fastened at its lower end by plug 80 to bearing shell 70. A bearing ring 82 is positioned within the central hole through upper magnet C. Bearing ring 82 may be made of many suitable materials such as plastic impregnated with lubricant, or graphite, and serves to guide the upper end portion of bearing pin 78. Shaft or spindle 66 is also provided with a centrally located bore 84 receiving the upper end of bearing pin 78. The depth of bore 84 is selected so its bottom serves as a stop for the upper end of bearing pin 78 to keep axial downward displacement of shaft 66 within certain limits. Bearing shell 70 has a cylindrical projection 86 partly surrounding upper magnet C to serve as a stop against extreme lateral displacement of shaft 66 which may be caused by shocks on the electricity meter frame from outside. As previously explained, each of upper and lower magnets C have been magnetized so that one pole is on a portion of an end surface 42 and the other pole on a portion of peripheral surface 44. Like poles of each magnet C face one another across air gap 50.

In one arrangement, magnet C may be formed from a sintered powder mixture of iron, aluminum, nickel and cobalt of a type known as alnico. Preferably, the alnico powder has a coercive force of at least 1500 Oersteds, and preferably around 1900 Oersteds. The material is preferably an anisotropic alnico alloy. It is also possible to form the permanent magnets from an alloy of rare earth, or from barium or strontium ferrite powder mixed with a thermoplastic binder. Such permanent magnet materials of alnico, rare earth and ferrite may be considered a class, and magnet C may be formed from any one material in the class. The magnets are preferably pressed or injection molded under the influence of a magnetic aligning field so that the particles will be aligned in the preferred direction of magnetization. The preferred direction of magnetization extends through the magnet from the pole on end surface 42 to the pole on peripheral surface 44. In the magnetic bearing described, each magnet C has an outside diameter of around 9 millimeters, an inside diameter of around 3 millimeters and an axial length of around 5 millimeters.

In the arrangement described, each magnetic pole N and S on each magnet C is directly exposed to non-magnetic material having a permeability of substantially unity so that lines 48 of magnetic flux interact at a circular vertex V having a diameter 47 larger than diameter 49 of each magnet C. This eliminates the high assembly costs and complicated arrangements of FIG. 1 and U.S. Pat. No. 3,326,610 wherein one pole is directly exposed to a magnetic material in the form of an iron cup or ring having a very high magnetic permeability.

While the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A magnetic suspension bearing comprising; a pair of permanent magnets, each of said magnets having a substantially flat circular end surface and a substantially cylindrical peripheral surface intersecting said end surface at an outer peripheral edge having a peripheral edge diameter, each of said magnets being magnetized to have a pair of spaced-apart magnetic poles of opposite polarity including one magnetic pole on said end surface thereof and an opposite magnetic pole on said peripheral surface thereof, each of said magnets having a longitudinal axis and being positioned in vertically spaced relationship with said longitudinal axes extending vertically and said end surfaces facing one another in substantially parallel spaced-apart relationship to define a facing space therebetween within said peripheral edges of said pair of magnets, each of said magnetic poles on each of said magnets being directly exposed to a non-magnetic material, said pair of poles on each of said magnets having lines of magnetic flux extending therebetween outside of said magnet, said pair of poles on each of said magnets being located relative to said peripheral edge to have said lines of magnetic flux extending into said facing space and outwardly of said facing space beyond said peripheral edge so that said lines of magnetic flux from said pair of magnets interact with one another outwardly of said facing space and said peripheral edges of said magnets at a circular vertex having a diameter substantially larger than said peripheral edge diameter and lying in a plane substantially parallel to said end surfaces and intermediate said end surfaces.

2. The bearing of claim 1 wherein said magnetic poles on each of said magnets have substantially the same area.

3. The bearing of claim 1 wherein the distance between said one end surface of each of said magnets and said opposite magnetic pole on said peripheral surface is at least 1 millimeter.

4. The bearing of claim 1 wherein each of said magnets comprise an anisotropic powdered permanent magnet material having a coercive force of at least 1500 Oersteds.

5. The bearing of claim 4 wherein said magnetic poles on each of said magnets have substantially the same area.

6. The bearing of claim 5 wherein the distance between said one end surface of each of said magnets and said opposite magnetic pole on said peripheral surface is at least 1 millimeter.

7. The bearing of claim 1 wherein said magnets are formed of permanent magnet material from the class consisting of alnico, rare earth and ferrite.

8. The bearing of claim 1 wherein said magnets are formed of material including powdered magnetic particles and each of said magnets have a preferred direction of magnetization extending through said magnet from said pole on said one end surface to said pole on said peripheral surface, said particles being aligned in said preferred direction.

* * * * *